United States Patent [19]

Kohler

[11] 4,033,485

[45] July 5, 1977

[54] MULTIPLE PASSAGE PLASTIC INJECTION NOZZLE WITH HEATERS

[76] Inventor: Arthur Kohler, 3942 E. 364th St., Eastlake, Ohio 44094

[22] Filed: Sept. 19, 1975

[21] Appl. No.: 616,758

[52] U.S. Cl. .................. 222/146 HE; 222/478; 425/548; 425/379 R
[51] Int. Cl.² ................ B29F 1/06; B29F 1/08
[58] Field of Search ............ 222/146 HE, 478, 482, 222/483, 484, 488; 425/243, 379 R, 382 R

[56] References Cited

UNITED STATES PATENTS

| | | | |
|---|---|---|---|
| 2,878,515 | 3/1959 | Strauss | 425/243 |
| 3,499,189 | 3/1970 | Perras | 425/243 X |
| 3,806,295 | 4/1974 | Gellert | 425/243 X |
| 3,923,209 | 12/1975 | Roy | 222/478 |

Primary Examiner—Robert B. Reeves
Assistant Examiner—David A. Scherbel
Attorney, Agent, or Firm—William N. Hogg

[57] ABSTRACT

A system for distributing a single stream of plastic into a multiplicity of streams is disclosed. The system includes two members, a plastic receiving member and a plastic discharge member. The receiving and discharge members are connectable in telescoping relationship. The receiving member has a central plastic receiving opening and a plurality of channels extending from said opening. The discharge member has a like number of passages communicating with the channels and terminating in discharge openings adapted to communicate with a mold. Also, internal heaters are provided to heat the plastic.

5 Claims, 6 Drawing Figures

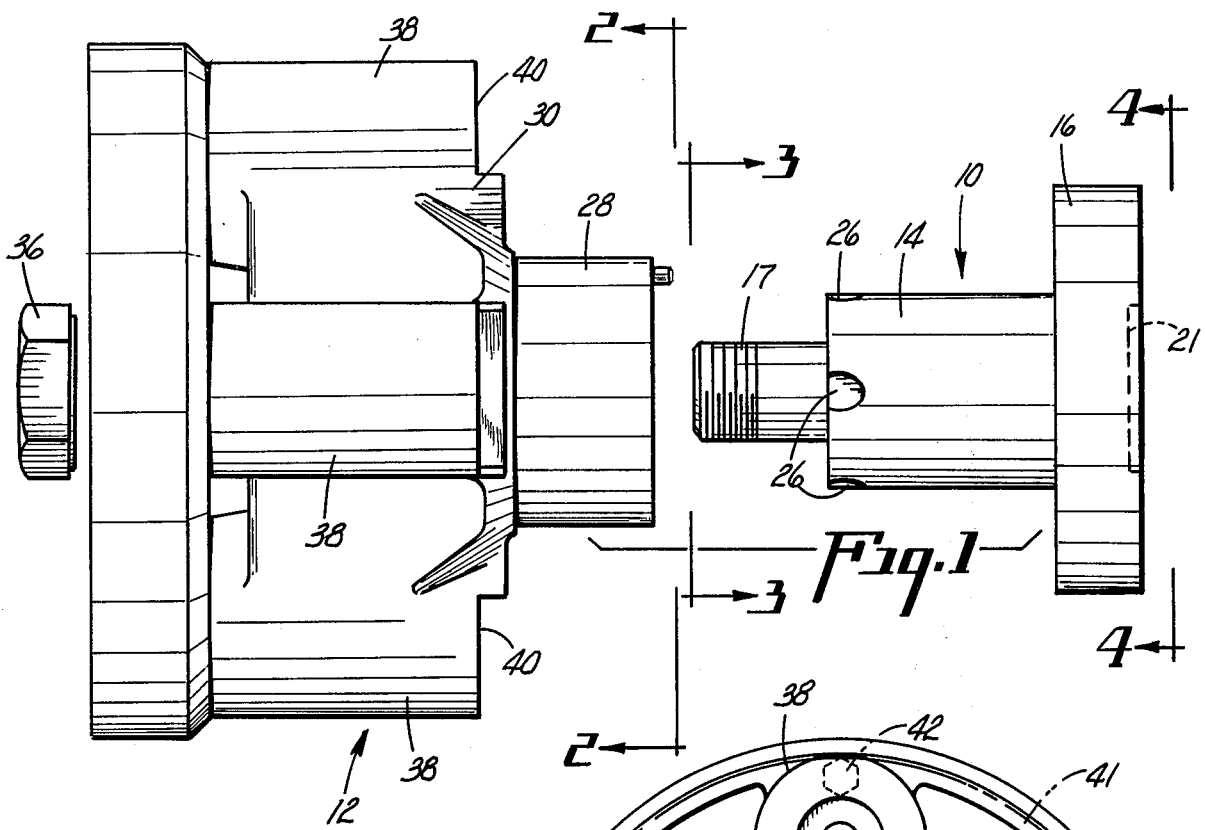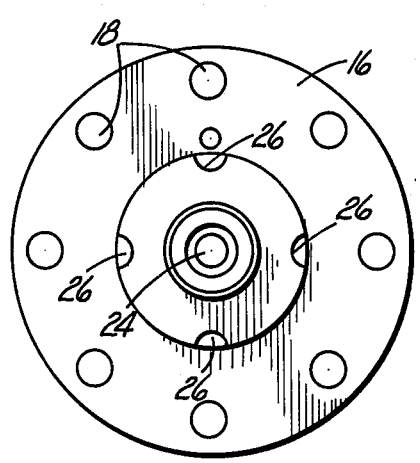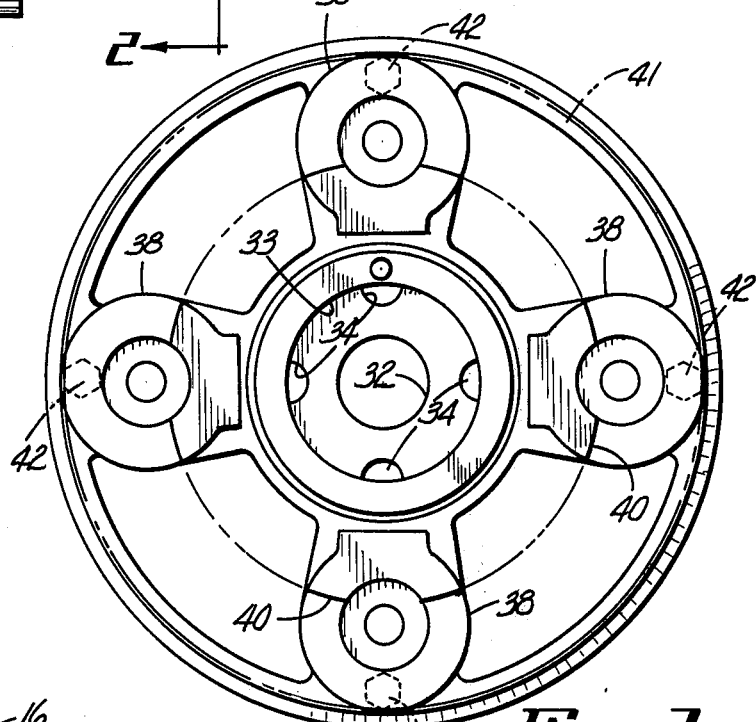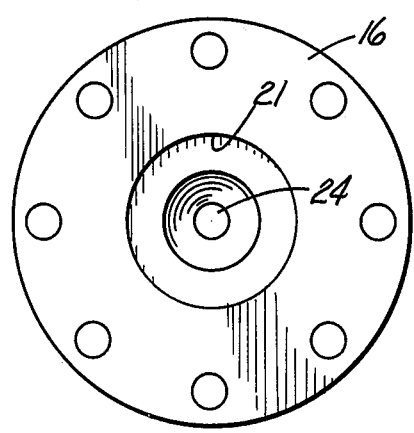

MULTIPLE PASSAGE PLASTIC INJECTION NOZZLE WITH HEATERS

BACKGROUND OF THE INVENTION

There have been several prior art proposals for multiple injection of liquid plastic. Examples of these are shown in U.S. Pat. No. 3,758,252 as well as application Ser. No. 531,976 filed Dec. 12. 1974 now abandoned and application Ser. No. 459,707 filed Apr. 10, 1974 now Pat. No. 3,915,610; all commonly owned by applicant. These patents and applications show various devices which in many cases are well suited for multiple injection of plastic into a mold.

However, these prior art devices, while working well in many instances, do require complete devices for each separate mold, and do present certain problems of maintaining the plastic hot during the entire molding cycle. Also, these devices represent rather expensive manufacturing techniques thus making the devices rather expensive to manufacture. However, the basic principle of the curved passage multiple injection concept of U.S. Pat. No. 3,758,252 is sound and has proven to be effective.

SUMMARY OF THE INVENTION

According to the present invention an apparatus for distributing a single stream of liquid plastic into a multiplicity of streams for injection molding is provided which includes a plastic receiving member and a plastic discharge member. Plastic receiving member has plastic receiving means including an opening for receiving plastic from an injection molding machine and a plurality of plastic conveying channels communicating with receiving means, each having outlet openings. The plastic discharge member has a plurality of discharge means each extending from an entrance opening to a discharge opening. Means detachably interconnect the receiving member and discharge member as a unitary assembly, thus providing for replacement of either of them individually. The conveying channels and the discharge means are selected in number and position such that the outlet opening of the conveying channels communicates with the entrance opening of the discharge means when said members are interconnected. Also, the present invention allows for effective heating of the plastic during the discharge cycle of the machine.

DESCRIPTION OF THE DRAWING

FIG. 1 is an elevational exploded view of one embodiment of multiple passage plastic injection device according to this invention;

FIG. 2 is a view taken looking substantially along the plane designated by the line 2—2 of FIG. 1;

FIG. 3 is a view taken looking substantially along the plane designated by the line 3—3 of FIG. 1;

FIG. 4 is a view taken looking substantially along the plane designated by the line 4—4 of FIG. 1;

DESCRIPTION OF THE PREFERRED EMBODIMENT

Figure 5:
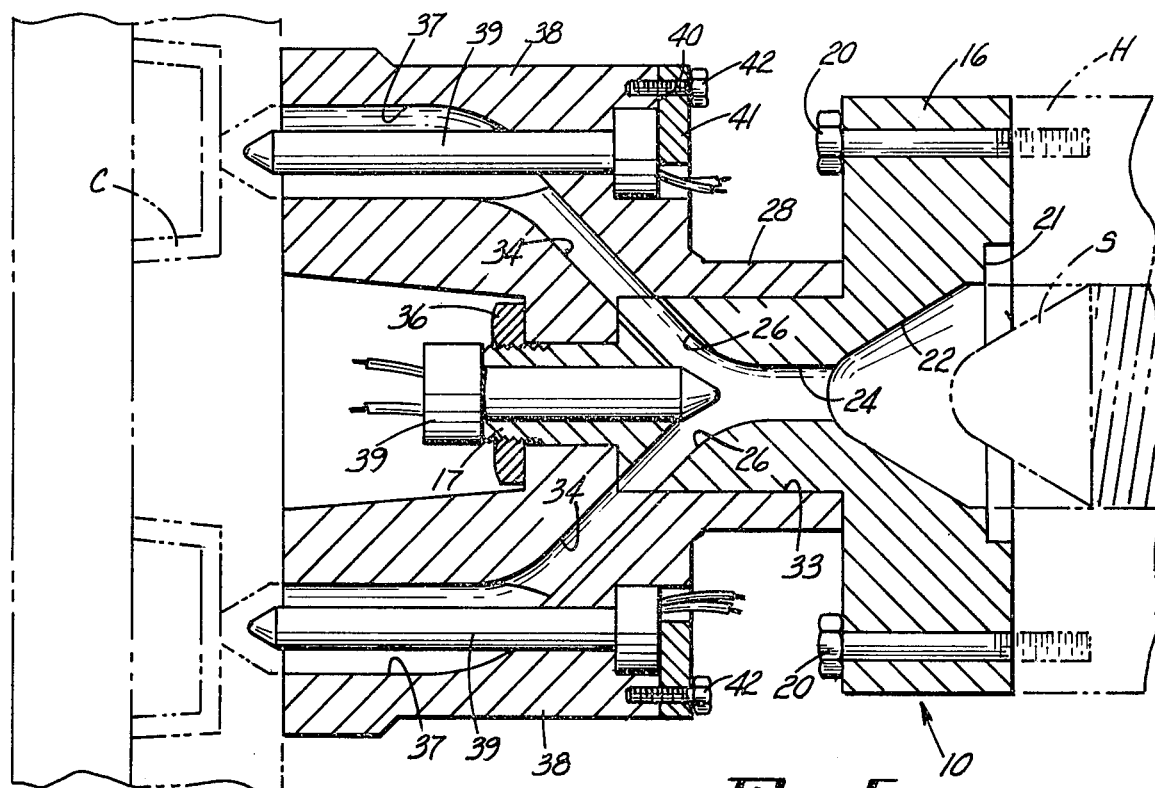
FIG. 5 is a longitudinal sectional view of the device of FIG. 1 assembled and mounted on a plastic injection molding machine and cooperating with a mold for injection molding.

Referring now to the drawing, and for the present to FIGS. 1 through 5, one embodiment of a multiple passage plastic injection device according to this invention is shown. The device of this invention has two principal members, the plastic receiving member designated generally as 10, and the plastic discharge member designated generally as 12. As will be explained presently, these two members are separate members, but interfit to provide a unitary assembly for injecting a multiplicity of streams of liquid plastic into a mold.

The plastic receiving member 10 includes a body portion 14, a flange portion 16, and a threaded extension portion 17. A plurality of circumferentially spaced openings 18 are provided around the flange portion 16 adapted to receive bolts 20 to bolt the plastic receiving member 10 to a barrel or head H of a plastic injection machine. The end surface of the flange portions 16 is stepped as shown in 21 and thus adapted to fit into a recess (unnumbered) formed on the head of the injection machine so as to exactly position the plastic receiving member 10 on the head H of the injection machine.

The flange portion 16 is provided with a generally frustroconically shaped opening 22 tapering to an axial bore 24 which extends completely through the body portion 14 of the plastic receiving member 10. The frustroconical opening 22 is shaped to receive the end of a screw S in the plastic molding machine and thereby receive plastic from the opening in the head H of the plastic injection machine. Radiating from the through bore 24 is a plurality (in this case four) of plastic conveying channels 26.

The plastic discharge member 12 includes an annular neck portion 28 and a hub portion 30. The neck portion 28 is adapted to slidably engage in telescoping relationship the body portion 14 of the plastic receiving member 10. The hub portion 30 is counterbored to provide a through axial opening 32 and an enlarged portion 33. A plurality of curved feeding passages 34 (in this case four such feed passages) extend from the enlarged portion 33. A nut 36 is provided which threadably engages the threaded extension portion 17 of the plastic receiving member 10 to interconnect the plastic receiving members 10 and 12 with the body portion 14 of the receiving member 10 in the enlarged opening 33, and the threaded extension 17 of the receiving member 10 extending through opening 32 of the discharge member 12 as shown in FIG. 5 to form a unitary assembly. The location and number of the plastic conveying channels 26 and the curved feeding passages 34 is selected such that the conveying passages 26 align with the feeding passages 34 to permit fluid flow from the conveying channels 26 to the feeding passages 34. Each of the feeding passages 34 communicates with a through longitudinal bore 37, the bores 37 being located in ribs 38 circumferentially spaced around the hub portion 30.

The bores 37 and bore 24 are adapted to receive torpedo type heaters designated by the reference character 39 directly within the bores to thereby provide heat to the plastic as it is being injected.

A flattened stepped surface 40 is provided on the end of each of the ribs 38 at the end of each of the bores 37 which surfaces 40 are adapted to receive a retaining ring 41 shown in dot-dash outline in FIG. 2 only which will fit around the hub portion 30 with bolts 42 also shown in dot-dash outline being provided to pass through the retainer ring 41 and bolt the ring to the hub portion 30 of the plastic discharge member 12. Thus the retaining ring 41 retains the heaters in place when the device is in operation. These flattened surfaces 40 are also shaped and positioned so that instead of a separate retaining ring 41 being used, the annular platten of plastic injection molding machines may fit into these flattened stepped portions and serve as a retaining ring against the heaters rather than using a separate retaining ring 41.

In operation the plastic receiving member 10 and plastic discharge members 12 are secured together by assembling them in telescoping relationship and threading the nut 36 onto the threaded end portion 17 of the plastic receiving member. The device is then secured to the head H of the injection molding machine by the bolts 20. The heaters are inserted, and if the retaining ring is being used it is secured to the hub portion. The plastic injection molding machine is then advanced until the end of the hub portion 30 comes in contact with the mold M having cavities C formed therein, each adapted and positioned to communicate with one of the longitudinal bores 37. The plastic molding machine itself generates the pressure to hold the face of the hub portion 30 against the mold M and plastic injection cycle can then be commenced. The plastic is fed by means of retracting and rotating the screws, and then injected by moving the screw forward in plunger style, forcing the plastic into the conical opening 22 to the bore 24, the curved conveying channels 26, the curved feeding passages 34, the longitudinal bores 37, and finally into the cavities C. The heaters 39 are preferably controlled automatically to maintain the desired heat in the plastic as it is being injected. Further, the passages are preferably curved as indicated. This curvature is for the purpose of insuring a smooth even flow of the plastic, eliminating corners with attendent potential plastic buildups, to thereby promote maximum plastic flow. Also the tip of the heater 39 in the bore 24 is in front of the end of the screw S. Thus there is precise temperature indication and control of the plastic after it has been plasticized just prior to its being split into several streams. This is very advantageous for molding control of the modern engineering plastics.

Figure 6:
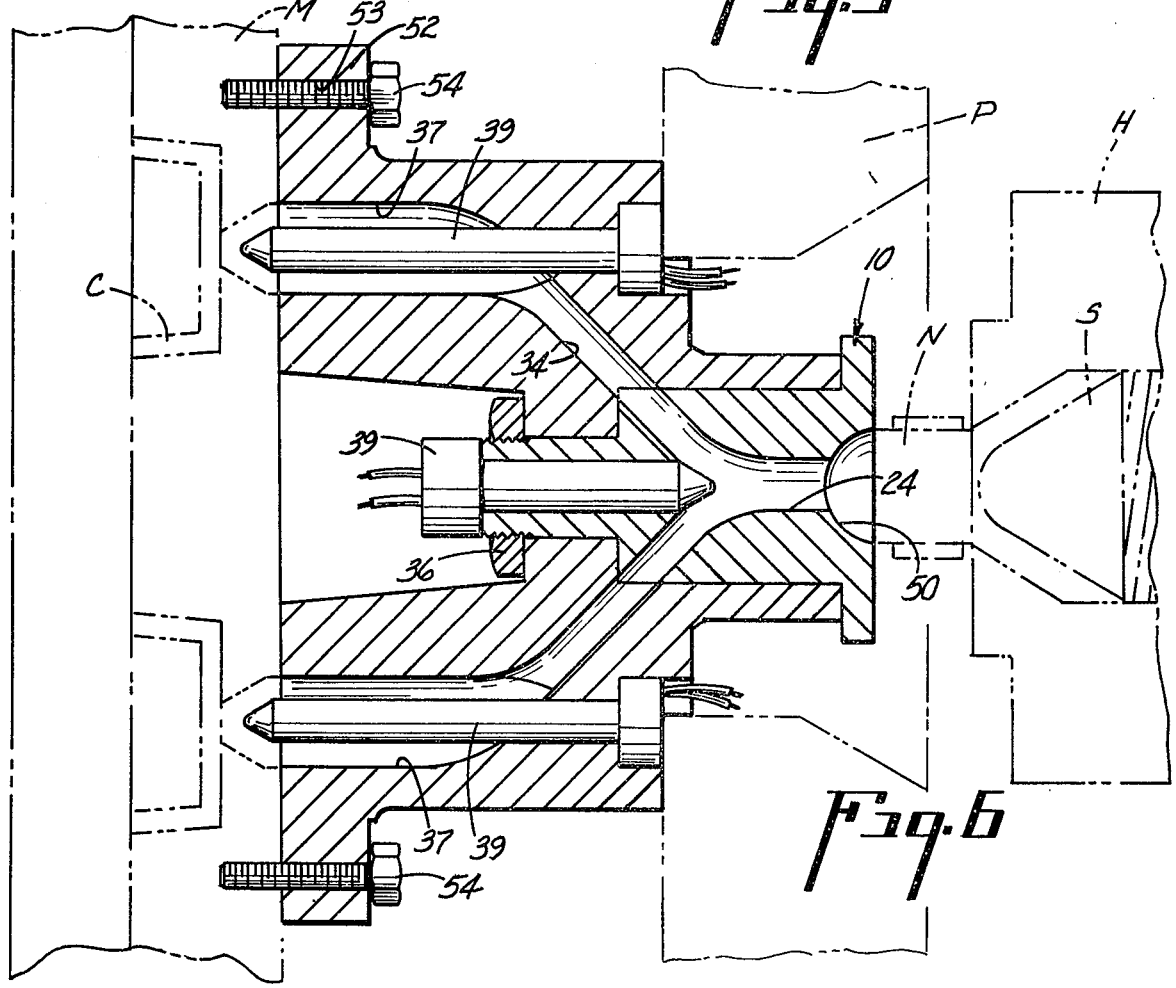
FIG. 6 is a longitudinal sectional view similar to FIG. 5 of another embodiment of the device of this invention.

The device of FIG. 6 is a very similar device to that of FIG. 5 and is adapted to be utilized with a nozzle N on the tip of a plastic injection molding machine. In this embodiment the plastic receiving member 10 has an arcuate opening 50 adapted to abut against the nozzle N. In this embodiment a large retaining flange 52 is provided which has openings 53 to allow bolts 54 to pass therethrough and be bolted directly to the mold M thus allowing the device to be secured to the mold and obviating the need for securing it to the head of the injection molding machine. Thus the device of this invention is adapted to be secured either directly to the injection molding machine or to the mold, whichever proves to be more practical in any particular case. Also, this embodiment depicts the platten P of the injection molding machine shown in dot-dash outline abutting against the heaters 39 in passages 37 to hold them in place rather than a separate ring.

It will be readily apparent that in both of the embodiments a device is provided which is comprised of two principal separate parts, the plastic receiving member and the plastic discharge member. These devices can be separately manufactured and separately assembled to provide maximum flexibility for molding operations. One very obvious advantage is that this construction allows for the placement of heaters both in the central opening 24 which receives the plastic and also in the individual various bores which discharge the plastic. Also, it will be noted that the amount of plastic flowing can be very easily controlled by merely changing the size of the bore 24 and curved plastic conveying channels 26. Thus to change the injection characteristics the entire die need not be replaced but merely the plastic receiving member can be changed, utilizing the same plastic discharge member. Conversely, if a different arrangement or configuration of injection is desired a separate plastic discharge member can be provided while utilizing the same plastic receiving member 10. Further, the purging operation is simplified in that the machine may be purged before the securing of the plastic discharge member, thus making the purging operation easier, less expensive, and much simpler. Also, if any damage or repair is needed the entire die need not be replaced, but merely the particular part which needs repair or replacement can be removed and repaired or replaced without the necessity of disabling the entire die.

Thus according to the present invention apparatus for distributing a single stream of liquid into a multiplicity of streams for injection molding is provided which is versatile, provides for efficient continuous heating of the plastic, and allow for maximum flexibility of operation.

What is claimed is:
1. Apparatus for distributing a single stream of liquid plastic into a multiplicity of streams for injection molding comprising,
   a plastic receiving member and a plastic discharge member,
   said plastic receiving member having plastic receiving means including a receiving passage and including an opening for receiving plastic from an injection molding machine, a heater disposed within said plastic passage, and a plurality of plastic conveying channels communicating with said receiving means each having outlet openings,
   said plastic discharge member having a plurality of plastic discharge means each extending from an entrance opening to a discharge opening,
   means to detachably interconnect said receiving member and said discharge member as a unitary assembly.
   said conveying channels and said discharge means being selected in number and positioned such that the outlet opening at each of the conveying channels communicates with the entrance opening of one of the discharge means when said members are interconnected.

2. The invention as defined in claim 1 further characterized a heater disposed internally in each of the plastic discharge means.

3. The invention as defined in claim 1 wherein said members are interconnected in a telescoping relationship.

4. Apparatus for distributing a single stream of liquid plastic into a multiplicity of streams for injection molding comprising,
   a plastic receiving member and a plastic discharge member, said plastic receiving member having plastic receiving means including an opening for receiving plastic from an injection molding machine, and a plurality of plastic conveying channels communicating with said receiving means each having outlet openings, said plastic discharge member having a plurality of plastic discharge means each extending from an entrance opening to a discharge opening, means to detachably interconnect said receiving member and said discharge member as a unitary assembly, said conveying channels and said discharge means being selected in number and positioned such that the outlet opening at each of the conveying channels communicates with the entrance opening of one of the discharge means when said members are interconnected, said members being interconnected in telescoping relationship, and wherein said plastic receiving member includes a through axial bore in said receiving member.

5. The invention as defined in claim 4 wherein each of said plastic discharge means includes through bores, said through bores being circumferentially spaced and axially arranged.

* * * * *